United States Patent
Robertson, Jr. et al.

(10) Patent No.: US 11,353,697 B2
(45) Date of Patent: Jun. 7, 2022

(54) ENHANCED VEHICLE SENSOR CLEANING

(71) Applicant: Ford Global Technologies, LLC, Dearborn, MI (US)

(72) Inventors: Michael Robertson, Jr., Livonia, MI (US); James Pizzimenti, Carleton, MI (US); Tyler D. Hamilton, Farmington, MI (US); Ashwin Arunmozhi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 284 days.

(21) Appl. No.: 16/600,610

(22) Filed: Oct. 14, 2019

(65) Prior Publication Data

US 2021/0109345 A1    Apr. 15, 2021

(51) Int. Cl.
| | |
|---|---|
| *B60S 1/52* | (2006.01) |
| *G02B 27/00* | (2006.01) |
| *B60S 1/08* | (2006.01) |
| *G01S 7/497* | (2006.01) |

(52) U.S. Cl.
CPC ........ *G02B 27/0006* (2013.01); *B60S 1/0848* (2013.01); *B60S 1/52* (2013.01); *G01S 7/497* (2013.01); *G01S 2007/4977* (2013.01)

(58) Field of Classification Search
None
See application file for complete search history.

(56) References Cited

U.S. PATENT DOCUMENTS

| | | | |
|---|---|---|---|
| 6,376,824 B1 | 4/2002 | Michenfelde et al. | |
| 7,002,480 B2 | 2/2006 | Kobayashi et al. | |
| 7,830,267 B2 | 11/2010 | Veerasamy | |
| 8,180,099 B2 | 5/2012 | Heenan et al. | |
| 8,671,504 B2 | 3/2014 | Ono et al. | |
| 9,144,361 B2 | 9/2015 | Landry et al. | |
| 9,464,982 B2 | 10/2016 | Tokhtuev et al. | |
| 10,189,450 B2 | 1/2019 | Rice | |
| 10,259,431 B1 | 4/2019 | Ybarra et al. | |
| 2005/0162119 A1* | 7/2005 | Landry | G05D 1/0272 318/580 |
| 2012/0243093 A1* | 9/2012 | Tonar | G03B 17/08 359/507 |
| 2018/0009418 A1 | 1/2018 | Newman | |
| 2018/0117642 A1* | 5/2018 | Magee | H01L 41/042 |
| 2018/0143298 A1* | 5/2018 | Newman | G08G 1/165 |
| 2018/0354468 A1 | 12/2018 | Krishnan et al. | |
| 2019/0077377 A1* | 3/2019 | Schmidt | B08B 5/02 |
| 2019/0135239 A1 | 5/2019 | Rice | |

FOREIGN PATENT DOCUMENTS

| | | |
|---|---|---|
| WO | 2018059806 A1 | 4/2018 |
| WO | 201094373 A1 | 5/2018 |

* cited by examiner

*Primary Examiner* — Cristi J Tate-Sims
(74) *Attorney, Agent, or Firm* — Frank A. MacKenzie; Bejin Bieneman PLC

(57) ABSTRACT

A computer includes a processor and a memory, the memory storing instructions executable by the processor to identify a contaminant on a lens of a sensor upon determining a force applied to the lens based on an electric current exceeding a threshold and to actuate a cleaning component to remove the contaminant from the lens.

14 Claims, 6 Drawing Sheets

ENHANCED VEHICLE SENSOR CLEANING

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. The sensors, e.g., sensor lens covers, may become dirty during operation of the vehicle. During vehicle operation, sensor data and/or environmental conditions around a vehicle can change, and such changes can affect sensor operation.

DETAILED DESCRIPTION

Figure 1:
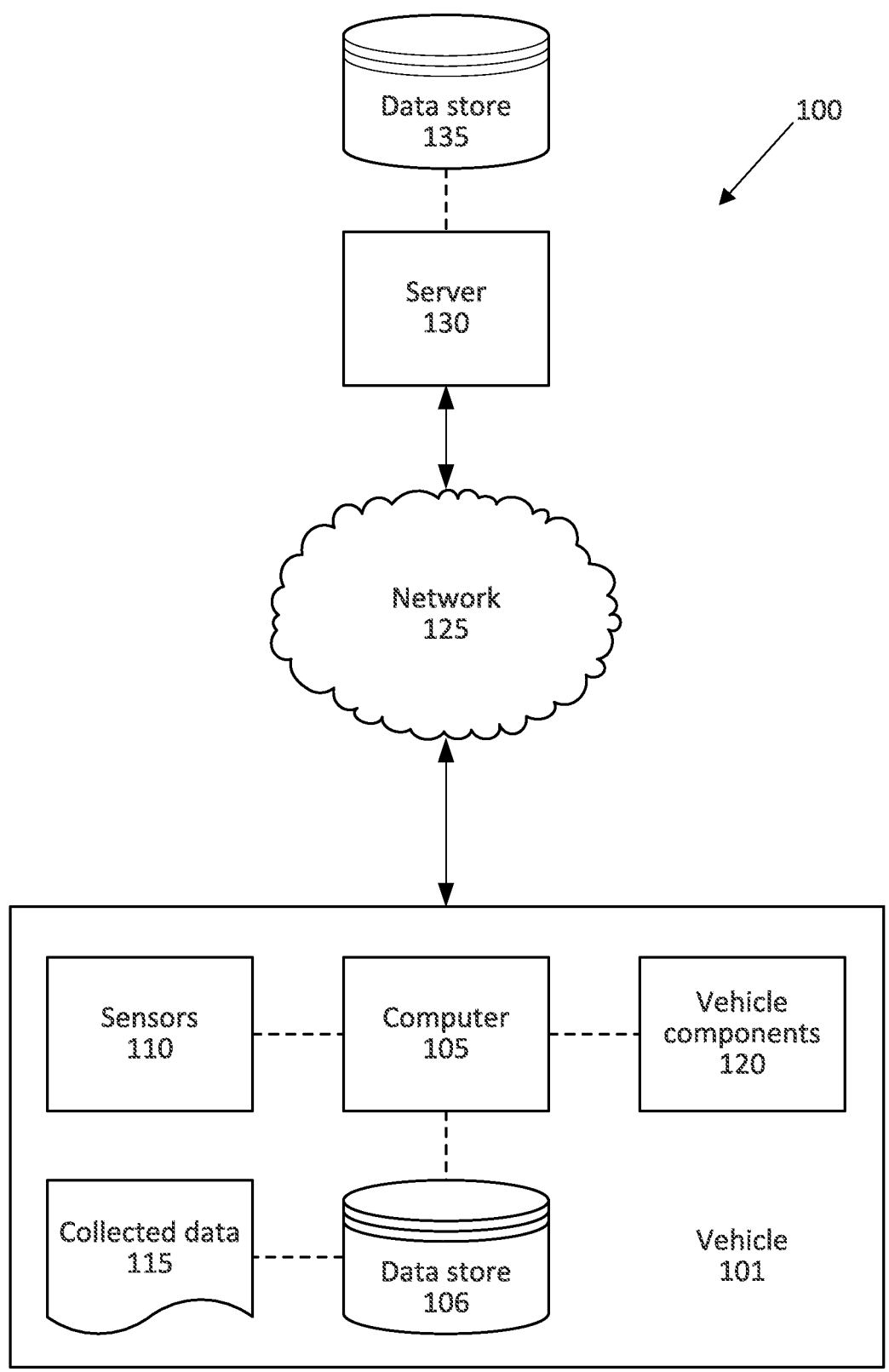
FIG. 1 is a block diagram of an example system for cleaning a sensor of a vehicle.

A system includes a computer including a processor and a memory, the memory storing instructions executable by the processor to identify a contaminant on a lens of a sensor upon determining a force applied to the lens based on an electric current exceeding a threshold and to actuate a cleaning component to remove the contaminant from the lens.

The system can further include a piezoelectric transducer mounted to the lens and arranged to generate the electric current.

The system can further include a second piezoelectric transducer mounted to the lens, and wherein the instructions further include instructions to transmit the electric current from the piezoelectric transducer to the second piezoelectric transducer to vibrate the lens.

The piezoelectric transducer can be mounted to the lens and a housing of the sensor, and the second piezoelectric transducer and the housing of the sensor define a gap therebetween.

The instructions can further include instructions to actuate a relay connecting the piezoelectric transducer to the second piezoelectric transducer upon determining that the electric current exceeds the threshold.

The cleaning component can include at least one of a fluid spray or an air nozzle.

The instructions can further include instructions to actuate both the fluid spray and the air nozzle to remove the contaminant.

The instructions can further include instructions to identify the contaminant upon detecting an electric current through a contact point between a first electrode film and a second electrode film, the first electrode film disposed above the lens and the second electrode film disposed on the lens.

The cleaning component can include a fluid spray and an air nozzle, and the instructions can further include instructions to detect precipitation with a precipitation sensor, to suppress actuation of the fluid spray upon detecting precipitation, and to actuate the air nozzle upon detecting precipitation.

A system includes a sensor including a lens, a cleaning component, and a piezoelectric transducer mounted to the lens and in communication with the cleaning component.

The system can further include a second piezoelectric transducer mounted to the lens and in electric communication with the piezoelectric transducer.

The sensor can include a housing, the piezoelectric transducer can be mounted to the lens and to the housing, and the second piezoelectric transducer and the housing can define a gap therebetween.

The second piezoelectric transducer can be arranged to vibrate the lens upon receiving an electric current from the piezoelectric transducer induced by a force applied to the lens.

A system includes a sensor including a lens, a cleaning component, means for identifying a contaminant on the lens upon determining a force applied to the lens based on an electric current exceeding a threshold, and means for actuating the cleaning component to remove the contaminant from the lens.

The system can further include means for detecting the force upon determining that an electric current from a piezoelectric transducer mounted to the lens exceeds a threshold.

The system can further include a second piezoelectric transducer mounted to the lens and means for transmitting the electric current from the piezoelectric transducer to the second piezoelectric transducer to vibrate the lens.

The system can further include means for actuating both the fluid spray and the air nozzle to remove the contaminant.

The system can further include means for identifying the contaminant upon detecting an electric current through a contact point between a first electrode film and a second electrode film, the first electrode film disposed above the lens and the second electrode film disposed on the lens.

A method includes identifying a contaminant on a lens of a sensor upon determining a force applied to the lens based on an electric current exceeding a threshold and actuating a cleaning component to remove the contaminant from the lens.

The sensor can further include a piezoelectric transducer mounted to the lens and arranged to generate the electric current.

The sensor can further include a second piezoelectric transducer mounted to the lens, and the method can further include transmitting the electric current from the piezoelectric transducer to the second piezoelectric transducer to vibrate the lens.

The piezoelectric transducer can be mounted to the lens and a housing of the sensor, and the second piezoelectric transducer and the housing of the sensor can define a gap therebetween.

The method can further include actuating a relay connecting the piezoelectric transducer to the second piezoelectric transducer upon determining that the electric current exceeds the threshold.

The cleaning component can include at least one of a fluid spray or an air nozzle.

The method can further include actuating both the fluid spray and the air nozzle to remove the contaminant.

The method can further include identifying the contaminant upon detecting an electric current through a contact point between a first electrode film and a second electrode film, the first electrode film disposed above the lens and the second electrode film disposed on the lens.

The cleaning component can include a fluid spray and an air nozzle, and the method can further include detecting precipitation with a precipitation sensor, suppressing actuation of the fluid spray upon detecting precipitation, and actuating the air nozzle upon detecting precipitation.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Detecting a force applied by a contaminant on a lens of a sensor allows a computer in a vehicle to actuate a cleaning component to remove the contaminant without additional image data identifying the contaminant. That is, rather than using a computer algorithm to process image data to determine whether the lens of the sensor is blocked by the contaminant, detection of the force applied by the contaminant reactively actuates the cleaning component. That is, the force applied to the lens can induce an electric current in a piezoelectric transducer, and the electric current can provide an indication to the computer to clean the lens or can directly vibrate a second piezoelectric transducer to vibrate the lens, causing some or all of the contaminant to shake off the lens.

FIG. 1 illustrates an example system 100 for cleaning a lens of a sensor of a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
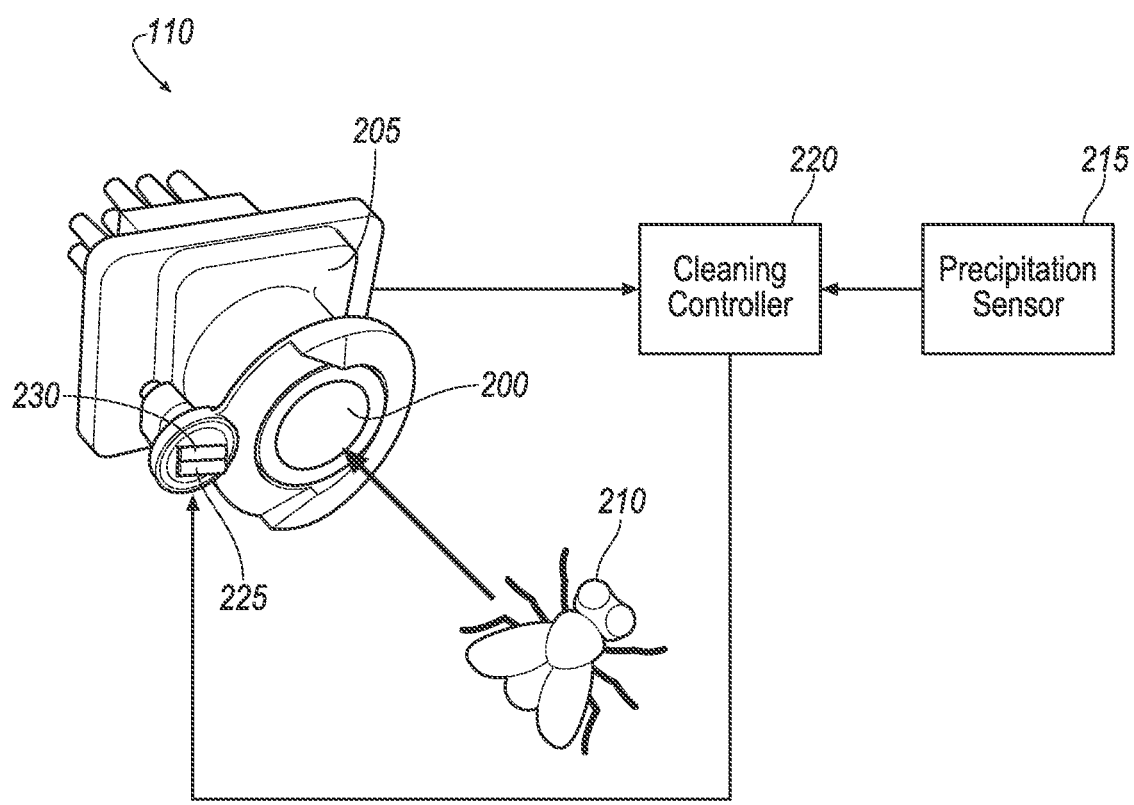
FIG. 2 is a perspective view of an example sensor.

FIG. 2 is a perspective view of a sensor 110. The sensor 110 can be, e.g., a camera, a lidar, etc. The sensor 110 includes a lens 200 and a housing 205. The lens 200 receives electromagnetic radiation (e.g., light, lasers, radio emissions, etc.) that the sensor 110 collects as data 115. The housing 205 secures the sensor 110 to the vehicle 101 body. For example, the housing 205 can secure the sensor 110 to, e.g., a roof, a front hood, a trunk door, etc.

A contaminant 210 can block data 115 collection through the lens 200. The "contaminant" is an object that restricts or blocks collection of data 115 through the lens 200. For example, the contaminant can be opaque, i.e., blocking light received by the lens 200. The contaminant 210 in FIG. 2 is shown as a creature (e.g., an insect, an arachnid, etc.) that blocks data 115 collection through the lens 200. The contaminant 210 can be a different object, e.g., dirt, dust, debris, rain, etc., that blocks or restricts collection of data 115. The contaminant 210 can generate a force on the lens 200. For example, the presence of the contaminant 210 can generate a gravitational force that pushes on the lens 200.

The vehicle 101 can include a precipitation sensor 215. The precipitation sensor 215 detects precipitation, e.g., rain, snow, sleet, etc. The precipitation sensor 215 communicates with the computer 105 over the network 125. Based on data 115 from the precipitation sensor 215, the computer 105 can actuate one or more components to remove the contaminant 210 from the lens 200. For example, if the precipitation sensor 215 detects rain, the computer 105 can actuate an air nozzle and suppress actuation of a fluid spray, as described below.

The vehicle 101 includes a cleaning component 120. The cleaning component 120 can include a cleaning controller 220 and at least one of an air nozzle 225 and a fluid spray 230. The cleaning component 120 removes the contaminant 210 from the lens 200 of the sensor 110. For example, the cleaning controller 220 can actuate the air nozzle 225 to spray air onto the lens 200, encouraging the creature to fly away from the lens 200. The cleaning controller 220 can be an electronic control unit (ECU), i.e., is a device including a processor and a memory that includes programming to control one or more components 120. The ECU can communicate with other ECUs over the network 125. When the precipitation sensor 215 detects precipitation, further liquid may not be necessary for removing the contaminant 210, and the cleaning controller 220 can actuate the air nozzle 225 to remove the precipitation and the contaminant 210 and can suppress actuation of the fluid spray 230.

Figure 3:
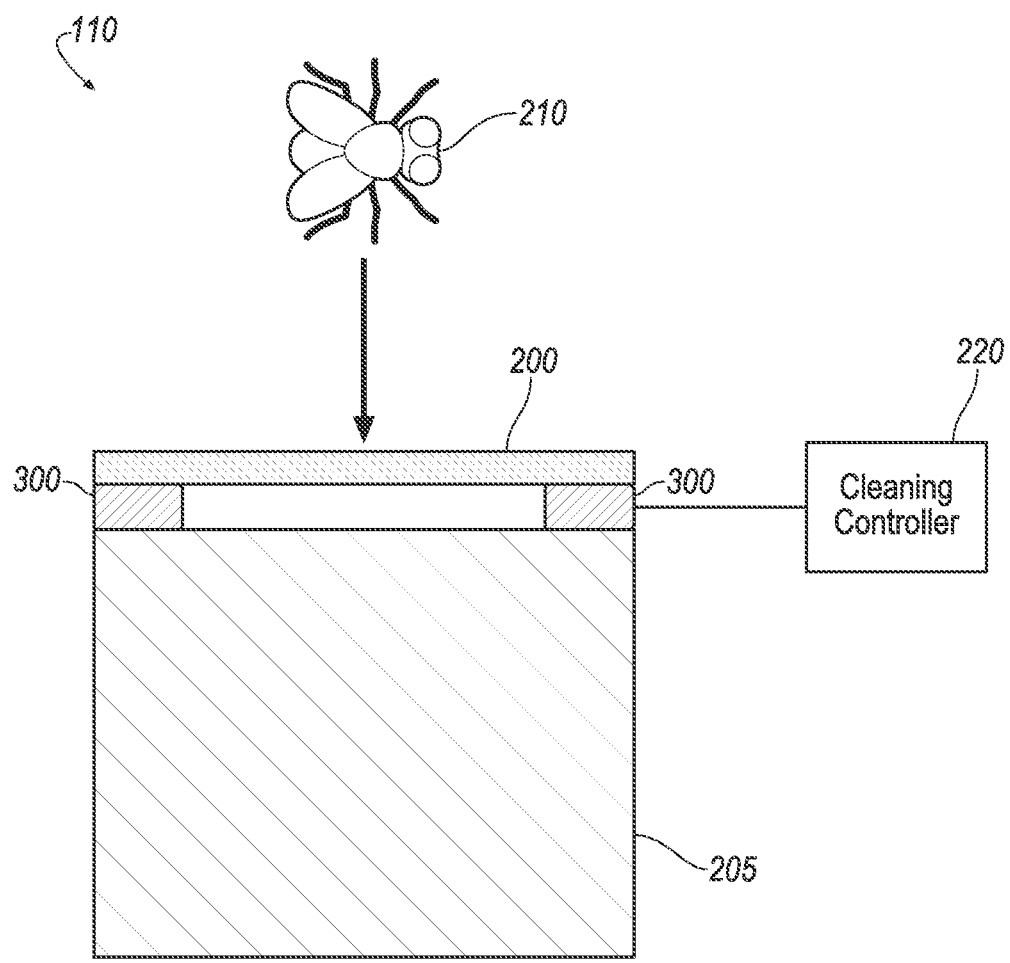
FIG. 3 is a side view of the example sensor of FIG. 2 with a piezoelectric transducer.

FIG. 3 is a side view of an example sensor 110. The sensor 110 includes the lens 200 and the housing 205, as described above. The sensor 110 includes a piezoelectric transducer 300. The piezoelectric transducer 300 is a device that includes a piezoelectric element, i.e., an element constructed of a piezoelectric material that generates an electric current upon receiving a force and vibrates upon receiving an electric current. Example piezoelectric materials include, e.g., quartz, lead titanate, langasite, lead zirconate titanate (PZT), etc. The piezoelectric transducer 300 is mounted to the lens 200 and the housing 205, i.e., directly connected to the lens 200 and the housing 205. When a force is applied to the lens 200, e.g., from the contaminant 210, the force induces an electric current in the piezoelectric transducer 300. The piezoelectric transducer 300 can be in electric communication with the cleaning controller 220.

The piezoelectric transducer 300 can transmit the electric current to the cleaning controller 220. Upon receiving the force on the lens 200, the force generates the electric current in the piezoelectric transducer 300, and the electric current is transmitted to the cleaning controller 220. The cleaning controller 220 can compare an amperage the current received from the piezoelectric transducer 300 to a current threshold. The current threshold can be an amperage value determined by empirical testing of forces applied to test sensors 110 from test contaminants 210 including, e.g., creatures, debris, etc. When the current exceeds the current threshold, the cleaning controller 220 can determine that a force is being applied to the lens 200 from a contaminant 210 and can actuate the air nozzle 225 and/or the fluid spray 230 to remove the contaminant 210 from the lens 200. That is, the cleaning controller 220 can actuate the air nozzle 225 to blow air onto the lens 200 to remove the contaminant 210. The cleaning controller 220 can actuate the fluid spray 230 to spray a liquid (e.g., water, liquid detergents, windshield washer fluids, etc.) onto the lens 200 to remove the contaminant 210. The cleaning controller 220 can actuate the fluid spray 230 to spray the liquid onto the lens 200 and then can actuate the air nozzle 225 to blow air onto the lens 200 to dry the liquid from the lens 200.

Figure 4:
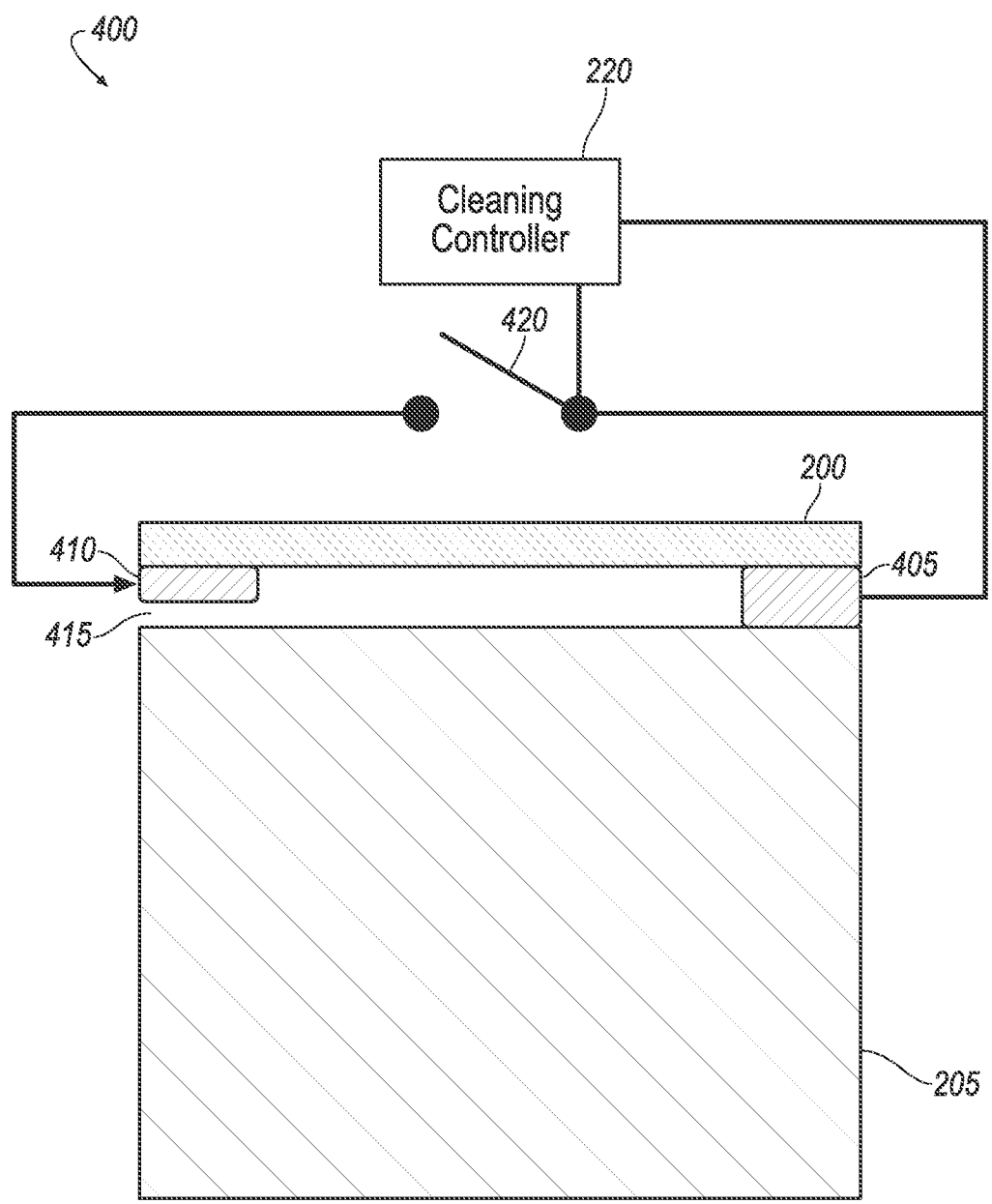
FIG. 4 is a side view of another example sensor with a second piezoelectric transducer.

FIG. 4 is a side view of another example sensor 400. The sensor 400 includes a lens 200 and a housing 205, as described above. The sensor 400 includes a first piezoelectric transducer 405. The first piezoelectric transducer 405 is mounted to the lens 200 and to the housing 205. When a force is applied to the lens 200 by a contaminant 210 (not shown in FIG. 4), the first piezoelectric transducer 405 can transmit an electric current to the cleaning controller 220.

The sensor 400 can include a second piezoelectric transducer 410. The second piezoelectric transducer 410 is mounted to the lens 200. The second piezoelectric transducer 410 defines a gap 415 with the housing 205. The second piezoelectric transducer 410 is in electric communication with the first piezoelectric transducer 405. The contaminant 210 can generate a force on the lens 200, causing the first piezoelectric transducer 405 to generate an electric current. Upon receiving the electric current from the first piezoelectric transducer 405, the second piezoelectric transducer 410 can vibrate the lens 200. Advantageously, when the lens 200 vibrates, some or all of the contaminant 210 can shake off of the lens 200. That is, the piezoelectric transducer 410 vibrates into the gap 415 upon receiving the electric current from the first piezoelectric transducer 405.

The first piezoelectric transducer 405 can provide the electric current to the second piezoelectric transducer 410. For example, as shown in FIG. 4, a relay 420 can electrically connect the first piezoelectric transducer 405 to the second piezoelectric transducer 410. When the relay 420 is open, electric current does not reach the second piezoelectric transducer 410. When the relay 420 is closed, electric current from the first piezoelectric transducer 405 reaches the second piezoelectric transducer 410, causing the second piezoelectric transducer 410 to vibrate the lens 200. The cleaning controller 220 can close the relay 420 upon receiving electric current from the first piezoelectric transducer 405 exceeding a current threshold, as described above. Alternatively, not shown in the Figures, the first piezoelectric transducer 405 can be electrically connected to the second piezoelectric transducer 410 with no relay 420 therebetween, and the electric current generated by the first piezoelectric transducer 405 can directly cause the second piezoelectric transducer 410 to vibrate without input from the cleaning controller 220 or the computer 105.

Figure 5:
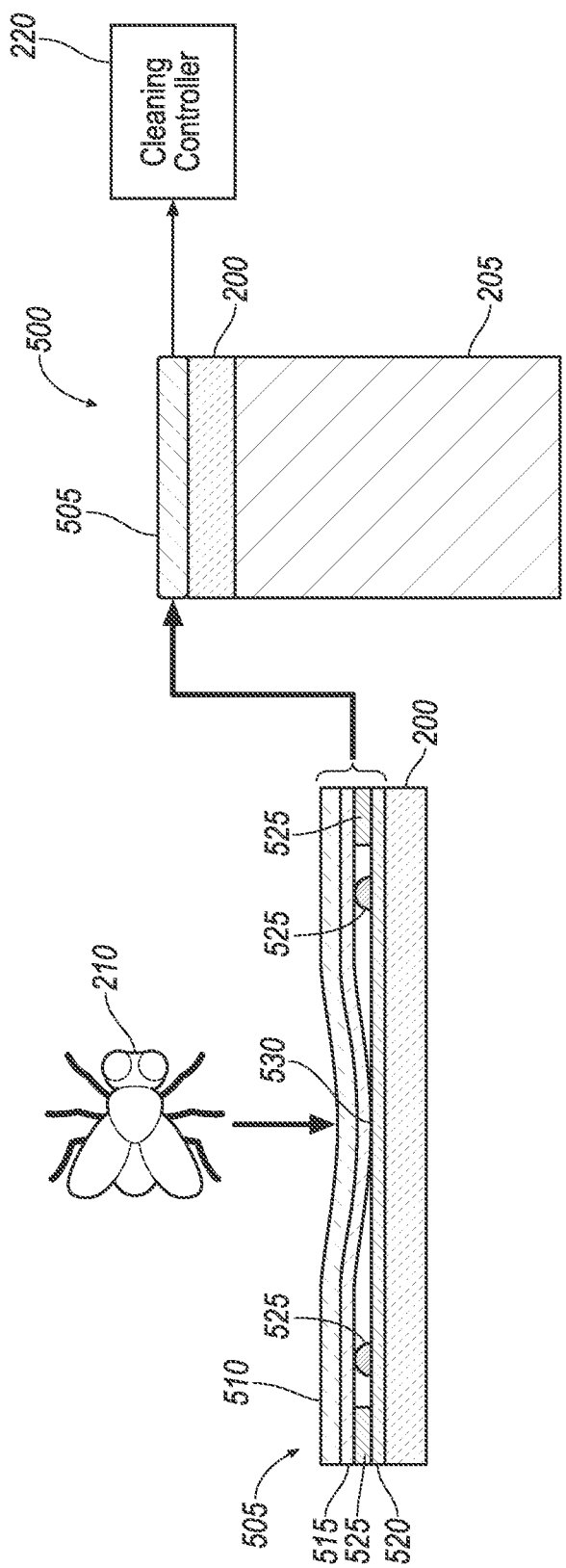
FIG. 5 is a side view of another example sensor with a resistive film.

FIG. 5 is a side view of another example sensor 500. The sensor 500 includes a resistive film 505 that detects force applied by a contaminant 210 to the lens 200. The resistive film 505 includes a contact layer 510, a first electrode film 515, a second electrode film 520, and a plurality of insulated spacers 525. The contact layer 510 is a transparent outer layer of the resistive film 505 that receives the contaminant 210. The contact layer 510 can be, e.g., a polymer film such as polycarbonate plastic that protects the first electrode film 515 from direct contact with the contaminant 210.

The resistive film 505 includes the first electrode film 515 and the second electrode film 520. The electrode films 515, 520 are transparent electromagnetic films, e.g., indium tin oxide sheets. The first electrode film 515 is disposed above the lens 200. The second electrode film 520 is disposed on the lens 200. The insulated spacers 525 prevent contact between the first electrode film 515 and the second electrode film 520 absent force applied by the contaminant 210. The insulated spacers 525 can be, e.g., hemispherical spacer dots, rectangular spacers, etc. When the contaminant 210 applies a force to the contact layer 510, the contact layer 510 and the first electrode film 515 yield past the spacers 525 and the first electrode film 515 contacts the second electrode film 520. Upon contact, an electric current flows through the electrode films 515, 520 at a contact point 530. That is, electric potential is stored through the electrode films 515, 520, and contact between the electrode films 515, 520 allows an electric current to flow through the contact point 530. The electric current is transmitted to the cleaning controller 220. When the electric current exceeds a current threshold, as described above, the cleaning controller 220 can determine that a force is being applied to the lens 200 and can actuate the air nozzle 225 and/or the fluid spray 230 to remove the contaminant 210 from the lens 200.

Figure 6:
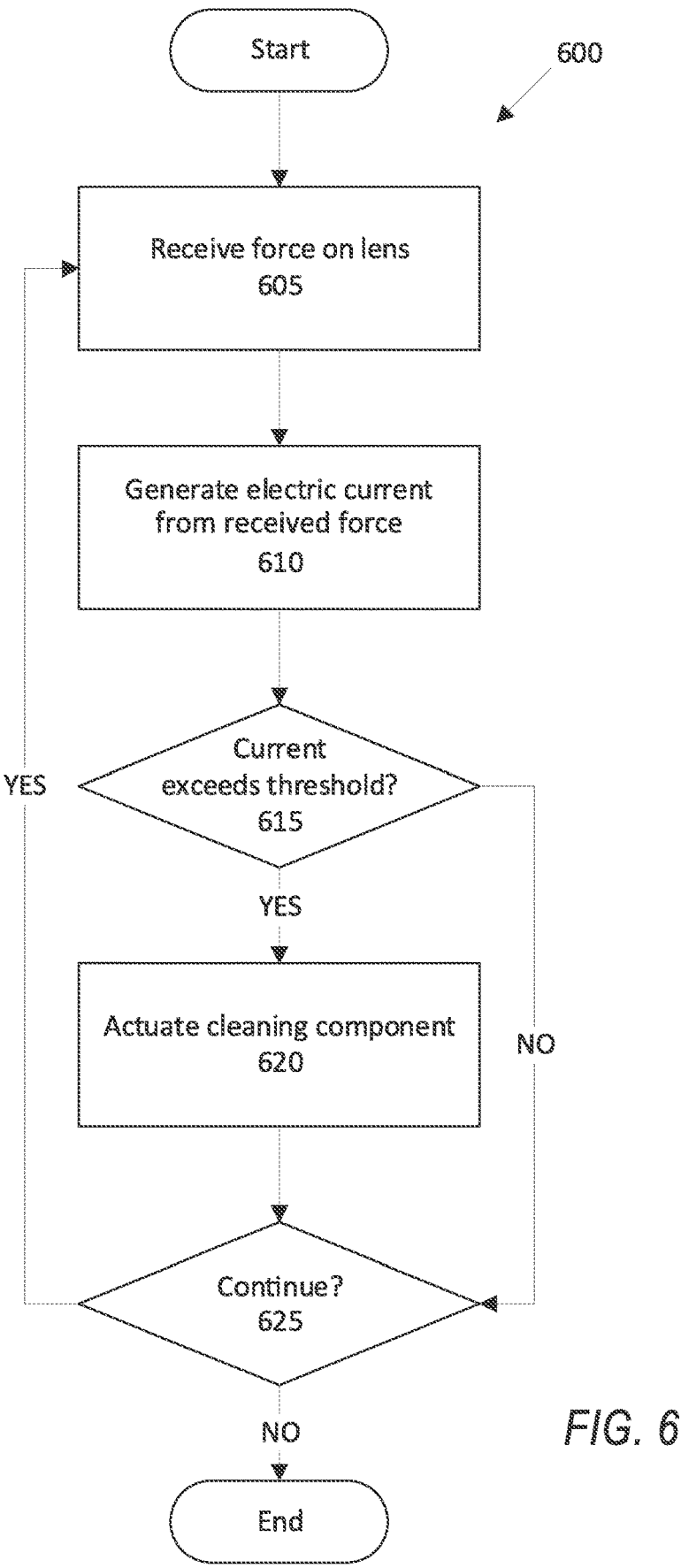
FIG. 6 is a block diagram of an example process for cleaning the sensor.

FIG. 6 is a block diagram of an example process 600 for cleaning a lens 200 of a sensor 110. The process 600 begins in a block 605, in which the lens 200 of the sensor 110 receives a force from a contaminant 210. As described above, the presence of the contaminant 210, such as a creature, debris, etc., on the lens 200 can generate a force on the lens 200, e.g., from gravity.

Next, in a block 610, the force on the lens 200 generates an electric current. For example, the force can generate an electric current from a piezoelectric transducer 300, 405. That is, the force induces an electric current in the piezoelectric material of the piezoelectric transducer 300, 405. In another example, the force can generate an electric current from contact between electrode films 515, 520. That is, at a contact point 530 between the electrode films 515, 520, electrical potential in the electrode films induces an electric current through the contact point 530.

Next, in a bock 615, the computer 105 determines whether the generated current exceeds a current threshold. As described above, the current threshold can be a value determined by empirical testing of forces applied to test sensors 110, e.g., forces determined to be forces that would be caused by a contaminant, to determine an amount of current likely to indicate a presence of a contaminant. If the generated current exceeds the current threshold, the process 600 continues in a block 620. Otherwise, the process 600 continues in a block 625.

In the block 620, the computer 105 actuates a cleaning component 120 to remove the contaminant 210. As described above, a cleaning controller 220 can actuate an air nozzle 225 and/or a fluid spray 230 to remove the contaminant 210 from the lens 200. The cleaning controller 220 can, upon detection of precipitation by a precipitation sensor 215, actuate the air nozzle 225 and suppress actuation of the fluid spray 230. Alternatively, the cleaning controller 220 can spray a liquid with the fluid spray 230 and the actuate the air nozzle 225 to dry the liquid from the lens 200. In another example, the cleaning controller 220 actuates a relay 420 that connects the piezoelectric transducer 300, 405 to a second piezoelectric transducer 410 to vibrate the lens 200.

In the block 625, the computer 105 determines whether to continue the process 600. For example, the computer 105 can determine not to continue the process 600 when the vehicle 101 is powered off. If the computer 105 determines to continue, the process 600 returns to the block 605. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
   a piezoelectric transducer mounted to a lens of a sensor and arranged to generate an electric current;
   a second piezoelectric transducer mounted to the lens; and
   a computer including a processor and a memory, the memory storing instructions executable by the processor to:
   identify a contaminant on the lens upon determining a force applied to the lens based on the electric current generated by the piezoelectric transducer exceeding a threshold;
   actuate a cleaning component to remove the contaminant from the lens; and
   transmit the electric current generated by the piezoelectric transducer to the second piezoelectric transducer to vibrate the lens.

2. The system of claim 1, wherein the piezoelectric transducer is mounted to the lens and a housing of the sensor, and the second piezoelectric transducer and the housing of the sensor define a gap therebetween.

3. The system of claim 1, wherein the instructions further include instructions to actuate a relay connecting the piezoelectric transducer to the second piezoelectric transducer upon determining that the electric current exceeds the threshold.

4. The system of claim 1, wherein the cleaning component includes at least one of a fluid spray or an air nozzle.

5. The system of claim 4, wherein the cleaning component includes the fluid spray and the air nozzle, and the instructions further include instructions to actuate both the fluid spray and the air nozzle to remove the contaminant.

6. The system of claim 1, wherein the instructions further include instructions to identify the contaminant upon detecting an electric current through a contact point between a first electrode film and a second electrode film, the first electrode film disposed above the lens and the second electrode film disposed on the lens.

7. The system of claim 1, wherein the cleaning component includes a fluid spray and an air nozzle, and the instructions further include instructions to detect precipitation with a precipitation sensor, to suppress actuation of the fluid spray upon detecting precipitation, and to actuate the air nozzle upon detecting precipitation.

8. A system, comprising:
   a sensor including a lens;
   a cleaning component;
   a piezoelectric transducer mounted to the lens and in communication with the cleaning component; and
   a second piezoelectric transducer mounted to the lens and in electric communication with the piezoelectric transducer;
   wherein the second piezoelectric transducer is arranged to vibrate the lens upon receiving an electric current generated by the piezoelectric transducer that is induced by a force applied to the lens.

9. The system of claim 8, wherein the sensor includes a housing, the piezoelectric transducer is mounted to the lens and to the housing, and the second piezoelectric transducer and the housing define a gap therebetween.

10. The system of claim 8, wherein the cleaning component includes at least one of a fluid spray or an air nozzle.

11. A system, comprising:
    a sensor including a lens;
    a cleaning component;
    a piezoelectric transducer mounted to the lens;
    a second piezoelectric transducer mounted to the lens;
    means for identifying a contaminant on the lens upon determining a force applied to the lens based on an electric current exceeding a threshold;
    means for actuating the cleaning component to remove the contaminant from the lens;
    means for detecting the force upon determining that an electric current from the piezoelectric transducer exceeds a threshold; and
    means for transmitting the electric current generated by the piezoelectric transducer to the second piezoelectric transducer to vibrate the lens.

12. The system of claim 11, wherein the cleaning component includes at least one of a fluid spray or an air nozzle.

13. The system of claim 12, wherein the cleaning component includes the fluid spray and the air nozzle, the system further comprising means for actuating both the fluid spray and the air nozzle to remove the contaminant.

14. The system of claim 11, further comprising means for identifying the contaminant upon detecting an electric current through a contact point between a first electrode film and a second electrode film, the first electrode film disposed above the lens and the second electrode film disposed on the lens.

* * * * *